United States Patent [19]

Horvath

[11] Patent Number: 4,950,085

[45] Date of Patent: Aug. 21, 1990

[54] MULTI-POSITIONAL THERMOMETER

[75] Inventor: Agoston Horvath, Plano, Tex.

[73] Assignee: Rochester Gauges, Inc., Dallas, Tex.

[21] Appl. No.: 306,571

[22] Filed: Feb. 6, 1989

[51] Int. Cl.$^5$ .............................................. G01K 5/62
[52] U.S. Cl. .................................. 374/207; 374/208; 374/195; 116/221; 116/292
[58] Field of Search ............... 374/205, 206, 207, 208, 374/155, 187, 195, 198, 200; 116/291, 292, 221; 403/90, 122, 123

[56] References Cited

U.S. PATENT DOCUMENTS

| | | | |
|---|---|---|---|
| 2,524,894 | 10/1950 | Dobrin | 403/90 |
| 2,638,785 | 5/1953 | Vacanti | 63/367 |
| 3,066,534 | 12/1962 | Pierson | 374/208 |
| 3,282,107 | 5/1965 | Ekstrom | 374/133 |
| 3,357,251 | 12/1967 | Harrison | 374/207 |
| 3,411,373 | 11/1968 | Zieber et al. | 403/122 |
| 3,431,782 | 3/1969 | Brophy, Jr. | 374/207 |
| 3,603,151 | 9/1971 | Zurstadt | 374/207 |
| 3,797,315 | 3/1974 | Halpern | 374/207 |
| 3,952,596 | 4/1976 | Patel | 374/207 |
| 4,137,771 | 2/1979 | Young et al. | 374/207 |
| 4,355,911 | 10/1982 | Tymkewicz | 374/165 |
| 4,416,553 | 11/1983 | Huebscher | 374/165 |
| 4,595,301 | 6/1986 | Taylor | 374/207 |

FOREIGN PATENT DOCUMENTS

| | | | |
|---|---|---|---|
| 176934 | 10/1961 | Sweden | 374/207 |
| 754569 | 8/1956 | United Kingdom | 374/195 |

*Primary Examiner*—William A. Cuchlinski, Jr.
*Assistant Examiner*—Diego F. F. Gutierrez
*Attorney, Agent, or Firm*—Richards, Medlock & Andrews

[57] ABSTRACT

A temperature sensing device having a gauge and a stem assemblies and utilizing a flexible coupling to transmit rotation through predetermined angles from a helical temperature sensitive element, to an indicator, further utilizing means to rotate the gauge assembly relative to the stem assembly. The gauge assembly includes a dial and the stem assembly includes the indicator, a stem, and the helical temperature sensitive element whereby rotation of the gauge assembly with respect to the stem assembly allows calibration of the dial to the indicator to reflect the appropriate temperature reading on the dial of the gauge assembly.

10 Claims, 3 Drawing Sheets

MULTI-POSITIONAL THERMOMETER

TECHNICAL FIELD

This invention relates to bimetallic thermometers and in particular to thermometers capable of universal positioning and self-calibration.

BACKGROUND OF THE INVENTION

The need to monitor and maintain a particular temperature is required in production of countless products in an array of industries, i.e. oil, chemicals, food, dairy products, refrigeration and air conditioning trades. Generally, thermometers of various designs, including bimetallic thermometers, are utilized to monitor the temperatures in a multitude of situations. Thermometers are sensitive and require constant calibration which is time consuming and expensive. Further, thermometers in general are rigid and not position adaptable as various situations require, thus limiting the applications any one thermometer can achieve. Current thermometers incorporate gear mechanisms to transmit motion from a temperature sensitive element to a gauge; this type of gear mechanism is complicated and expensive.

Thus, a need exists for a simple inexpensive thermometer which can be calibrated easily without requiring technical expertise. Additionally, a thermometer with multiple degrees of freedom for monitoring temperatures in multiple planes is also required. A thermometer having these characteristics should incorporate a simple inexpensive means to couple the temperature sensitive element to the gauge indicator while negotiating the angle of the temperature sensitive element to the gauge.

SUMMARY OF THE INVENTION

The temperature sensing device of the present invention utilizes a flexible coupling to communicate reactions from the temperature sensitive element to the gauge indicator. This allows the temperature sensitive element to be located at an angle to the gauge without a loss of relation between the gauge and temperature sensitive element. Further, securing means are employed so that once the device is put into place, the gauge may be positioned relative to the stem, thereby calibrating the gauge to the desired temperature reading.

BRIEF DESCRIPTION OF THE DRAWINGS

Further objectives and advantages of the invention will become more apparent from the following Detailed Description and Claims, and from the accompanying drawings, wherein:

FIG. 4 is a plan view of the third embodiment of the temperature sensing device.

DETAILED DESCRIPTION

Figure 1:
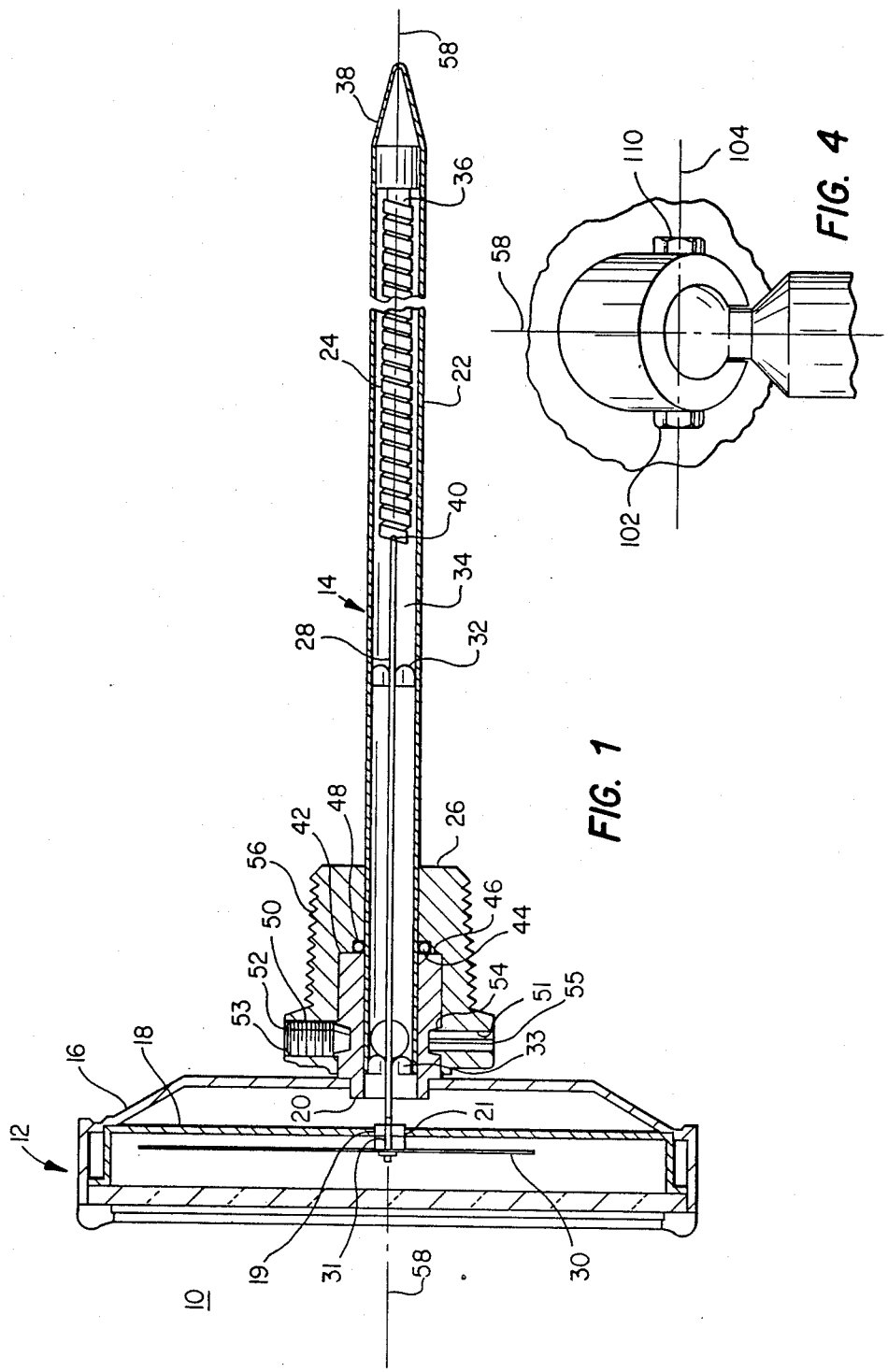
FIG. 1 is a cross section view of the first embodiment of the temperature sensing device.

Referring now to FIG. 1, a specific embodiment of the temperature sensing device of the present invention is shown and generally identified as device 10. Device 10 includes a gauge assembly 12 coupled to stem assembly 14. The stem assembly 14 extends perpendicularly from the gauge assembly 12, along axis 58.

The gauge assembly 12 incorporates a housing 16, a dial 18 having a bore 19, an extension 20 and connector 21.

The stem assembly 14 incorporates a stem 22, a stem cavity 34, a bimetallic strip 24, an annular extension 26, a connecting rod 28, bearings 32 and 33 and an indicator 30 having rod 31 extending perpendicularly along the axis 58. The bimetallic strip 24 is helical in shape and is located within the stem cavity 34. A first end 36 of the bimetallic strip 24 is attached to the end 38 of the stem 22. The connecting rod 28 is attached to the second end 40 of the bimetallic strip 24 and extends along the length of the stem cavity 34 and is attached to the rod 31 through connector 21 extending through bore 19. The connector 21 acts as a bearing between the indicator rod 31 and the bore 19 thereby maintaining the position of the indicator 30 during rotation. The position of the connecting rod 28 is maintained in the stem cavity 34 along the linear axis of stem 58 by bearings 32 and 33.

The extension 20 is inserted into cavity 42 of the annular extension 26 of the stem assembly 14. An 0-ring 44 is generally captured between the surface 46 of extension 20 and the bottom surface 48 of cavity 42. A threaded bore 50 is located in the annular extension 26. A set screw 52 engages the bore threads 53 and can be screwed in until bottoming on the slot 54 located in the extension 20. A first roll pin 55 is positioned in the smooth bore 51 of the annular extension 26 extending into and bottoming on slot 54, maintaining the position of the stem assembly 14 to the gauge assembly 12 while allowing rotation of the gauge assembly 12 about axis 58.

Outer pipe threads 56 on the annular extension 26 secure the temperature sensing device 10 in its installation position. The temperature sensing device 10 may be located through a wall, container, vat or any number of devices or fixtures, too numerous to list.

Once the temperature sensing device 10 is positioned, the set screw 52 may be loosened slightly, allowing rotation of the gauge assembly 12 about the linear axis 58 of the stem assembly 14, without disassembly of the entire device 10. Rotation of the gauge assembly 12, relative to the stem assembly, allows the dial 18 to be positioned relative to indicator 30 for calibration. Once the desired temperature is set, the set screw 52 is rotated and tightened against the slot 54, thus securing the gauge assembly 12 to the stem assembly 14.

Figure 2:
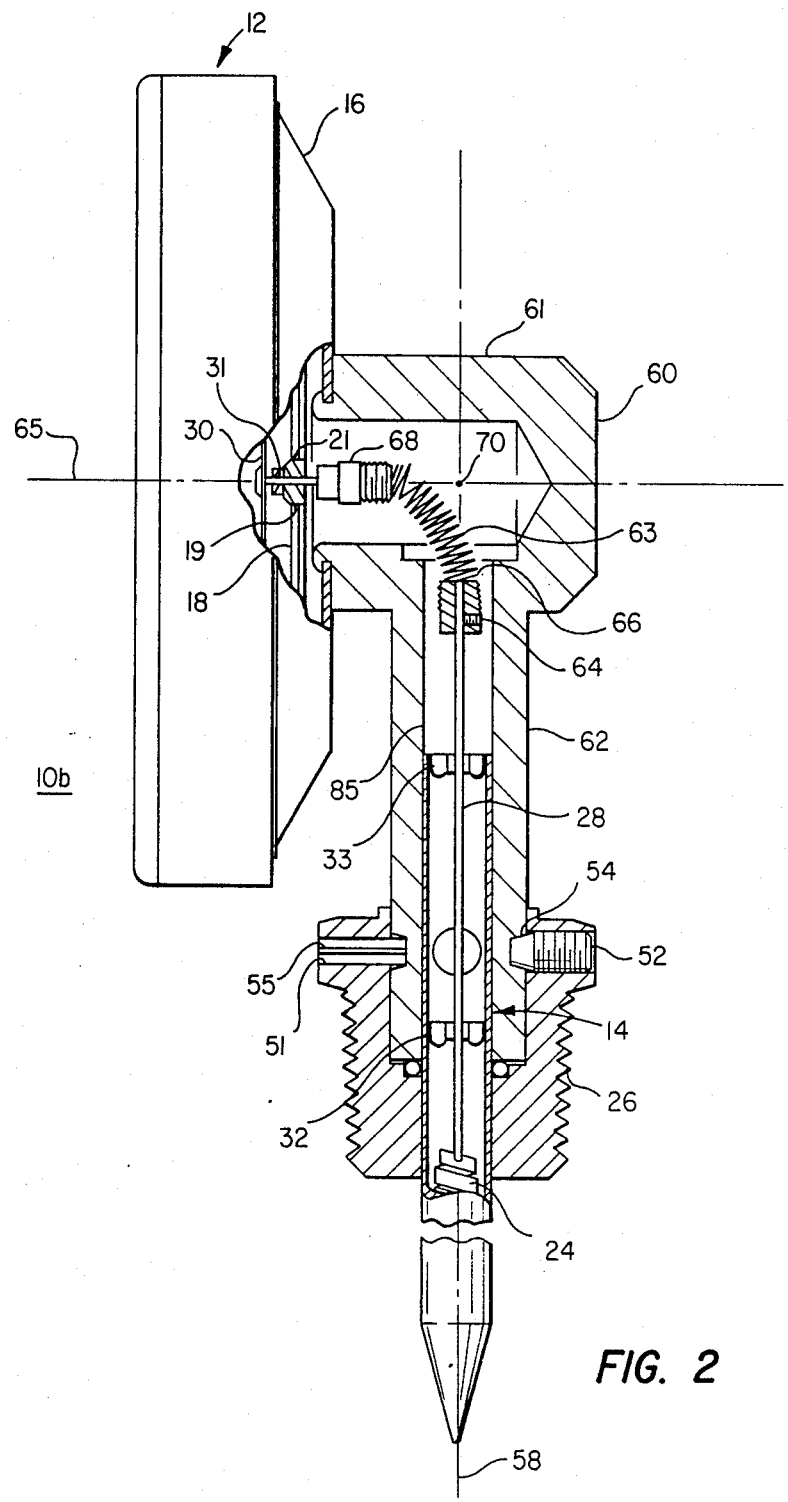
FIG. 2 is a cross section view of the second embodiment of the temperature sensing device with the stem assembly located 90° to the gauge assembly.

Referring now to FIG. 2, another embodiment of the present invention is shown and generally identified as device 10b. The gauge assembly 12 and stem assembly 14 are embodied at a particular angle to each other. The angle depicted in FIG. 2 is 90°, but it is only illustrative of the possible positioning of the stem assembly 14 relative to the gauge assembly 12.

In device 10b, the extension 20 of the gauge assembly 12 is replaced by elbow joint 60 having a 90° angle. The first elbow section 61 extends from the housing 16 perpendicularly along the indicator axis 65 until it meets the second elbow section 62 which extends 90° from the first elbow section 61 along axis 58. The indicator axis 65 extends perpendicular to the plane created by the dial 18. The axis 58 extends perpendicular to and intersects the indicator axis 65.

The connecting rod 28 extends into the second elbow section 62 and attaches to a helical spring 63 through a first adapter 64 connected to the spring end 66. The spring 63, being flexible and able to transmit torque, bends around the elbow joint angle 70 and is connected to the rod 31 of indicator 30 through connector 21 passing through bore 19 and attaching to the second adapter 68. Rotation of the bimetallic strip 24 about the axis 58 may be transmitted to an axis such as the indicator axis 65 without loss of rotation between the bimetallic strip 24 and the indicator 30.

A spring 63 is not the only device which could transmit the torque from the bimetallic strip 24 at an angle. With the advent of specialized materials, there may be a number of substances which could transmit angular motion through various degrees of bending. Further, the adapters 64 and 68 may be designed so as to allow a number of materials to accomplish the desired characteristics required in the present invention. Specifically, having the ability to faithfully transfer angular motion about axis 58 emitted from a bimetallic strip through a rod directly to an indicator rotating about a different axis 65.

Once the temperature sensing device 10b is mounted, the set screw 52 may be loosened slightly, allowing rotation of the gauge assembly 12 about the axis 58 without disassembly of the entire device 10b. Rotation of the gauge assembly, 12, relative to the stem assembly 14 allows the dial 18 to be set to the corresponding reference temperature represented by the position of the indicator 30. Once the dial is calibrated, the set screw 52 is rotated and tightened on slot 54 thus securing the gauge assembly 12 to the stem assembly 14.

Figures 3, 5:
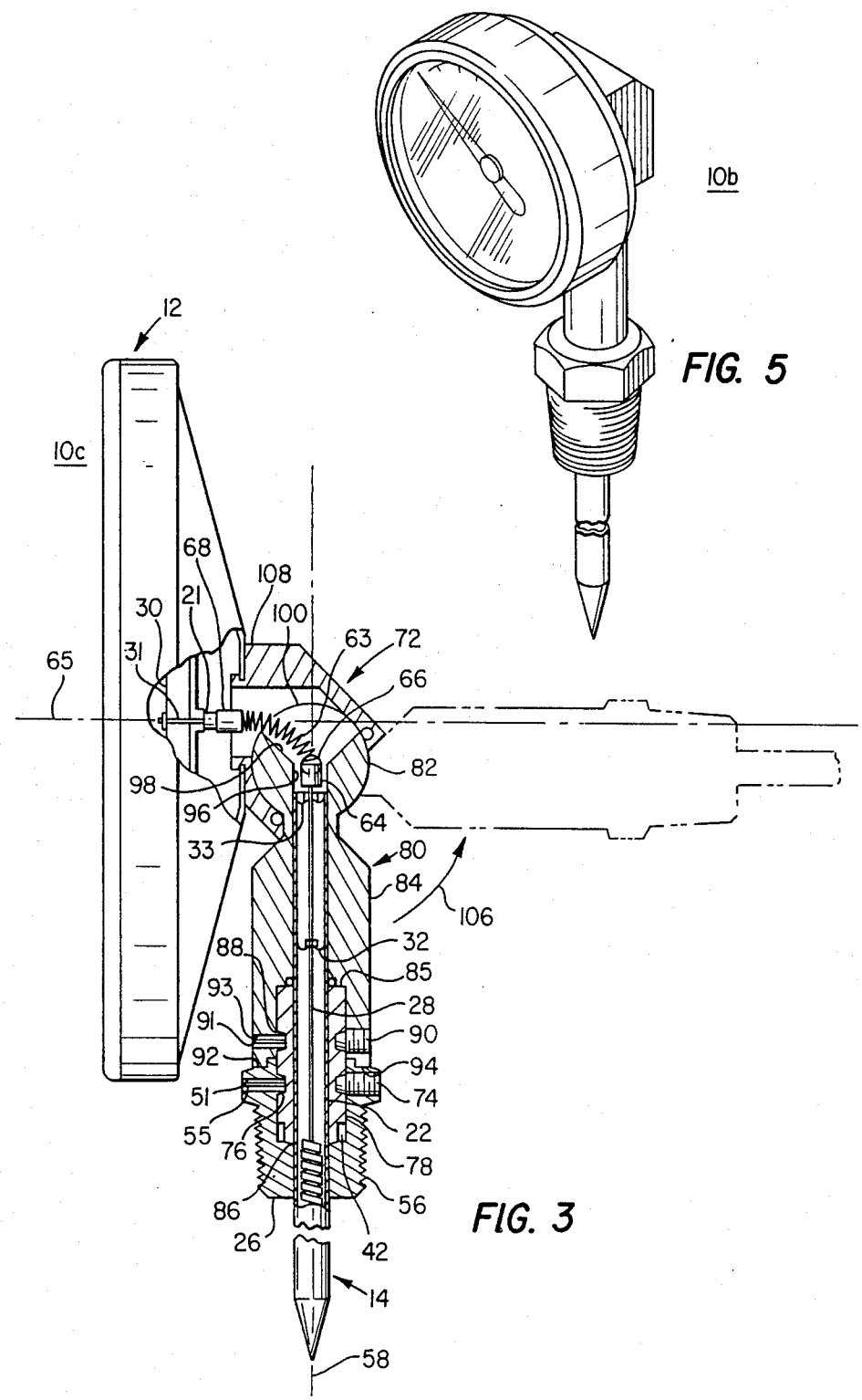
FIG. 3 is the third embodiment of the temperature sensing device having multi-positional capabilities.
FIG. 5 is a perspective view of the second embodiment of the present invention.

Referring now to FIG. 3, another embodiment of the present invention is shown having universal position capabilities and is generally identified as device 10c. The gauge assembly 12 is attached to the stem assembly 14 through a ball and socket joint 72. Further, the annular extension 26 of the stem assembly 14, is not rigidly attached to the stem 22 as in FIGS. 1 and 2, but is attached on the stem assembly 14.

The ball assembly 80 incorporates a ball 82 and a sleeve 84. The sleeve bearing 78 is attached by a weld 86 along the length of the stem assembly 14. The stem assembly 14 is inserted into the cavity 85 of the sleeve 84 until the first slot 88 of the sleeve bearing 78 is aligned with the first set screw 90 located in the sleeve 84 of the ball assembly 80. The second roll pin 91 is inserted into bore 93 of the sleeve 84, extending into and bottoming on the first slot 88, maintaining the position of the stem assembly 14 in relation to the gauge assembly 12 and ball assembly 80 while allowing rotation of the gauge assembly 12 about axis 58. The first set screw 90 is tightened into the first slot 88 thus locking the position of the gauge assembly 12 relative to the stem assembly 14, about axis 58. The annular extension 26 is located on the stem 22 of the stem assembly 14.

The annular extension 26 is positioned so that the bottom portion of the sleeve bearing 78 is located in the cavity 42 of the annular extension 26 thus aligning the second set screw 74 with the second slot 76. The top surface 92 of annular extension 26 rests against the bottom surface 94 of the sleeve 84 of the ball assembly 80. The first roll pin 55 extends through the smooth bore 51 of the annular extension 26 bottoming on the second slot 76 of the sleeve bearing 78 connecting the annular extension 26 to the stem assembly 14 while allowing the annular extension 26 to rotate about axis 58. The annular extension 26 is locked in place by the second set screw 74 which is rotated and tightened against the second slot 76 of the sleeve bearing 78.

The connecting rod 28 extends through the stem 22 and the ball bore 96 and connects to the spring 63 through a first adapter 64 connected to the spring end 66. The spring is located in the ball joint 72, and more specifically, in the cone shaped counter bore 98 which is located in the top 100 of the ball 82. The spring 63 extends to connect to rod 31 of indicator 30 through connector 21 and a second adapter 68. The position of the socket 108 on the ball 82 is maintained by two screws 102 and 110 located along the socket axis 104, perpendicular to the stem axis 58 (see FIG. 4) whereby the stem assembly 14 may be positioned at any angle to the gauge assembly 12 along the arc 106.

Once the device 10c is installed by means of the pipe threads 56 of the annular extension 26, calibration of the gauge assembly 12 may be accomplished by loosening the first set screw 90 so that the gauge assembly 12 and ball assembly 80 may be rotated about the stem axis 58 relative to the stem assembly 14 thus positioning the dial 18 to the desired reading. The first set screw 90 is tightened on the first slot 88 of the sleeve bearing 78. Should a different gauge assembly 12 position be desired, loosening of the second set screw 74 allows rotation of the stem assembly and gauge assembly about axis 58 relative to the annular extension 26 without disturbing the calibration.

The degrees of freedom provided in this embodiment of the present invention, shown in FIG. 3, allows for universal positioning of the temperature sensing device 10c.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed:

1. A temperature sensing device having a gauge assembly including a dial, and a stem assembly including an indicator, a stem, and a temperature sensitive helical bimetallic strip connected at one end to said stem comprising:

means to connect the indicator to the bimetallic strip at the free end of the bimetallic strip; and
   a means to connect the gauge assembly to the stem assembly including a set screw and a means for limiting motion between the gauge assembly and the stem assembly to rotation relative each other in a single plane wherein the gauge assembly may be rotated relative tot he stem assembly allowing calibration of the dial to the indicator to reflect the appropriate temperature reading on the dial of the gauge assembly and secured in place by the set screw, wherein a temperature change causes the bimetallic strip to expand or contract, resulting in rotation of the free end of the helical strip thus rotating the indicator.

2. The temperature sensing device of claim 1 further comprising:

means to secure the device relative to the environment in which the stem assembly is located.

3. The temperature sensing device of claim 1 further comprising:

said means to connect the indicator to the bimetallic strip includes a flexible coupling to connect the indicator to the free end of the bimetallic strip;

the stem assembly located at a predetermined angle to the gauge assembly; and the flexible coupling conforming to the angular relation of the stem assembly to the gauge assembly thereby allowing the stem assembly to be positioned at some angle to the gauge assembly without loss of torsional relation between the helical bimetallic strip and indicator.

4. The temperature sensing device of claim 3 further comprising:

means to position the stem assembly at a predetermined angle to the gauge assembly, said means being adjustable so as to facilitate changing the angle of the stem assembly relative to the gauge assembly.

5. A temperature sensing device having a gauge assembly including a dial, and a stem assembly including an indicator, a stem, and temperature sensitive helical bimetallic strip having two ends, connected at one end to said stem comprising:

a first plane wherein lies the gauge assembly;

a second plane angularly located to the first plane wherein lies the stem assembly;

a flexible coupling connecting the indicator to the free end of the bimetallic strip whereby rotation of the bimetallic strip in the second plane is directly related to the gauge indicator located in the first plane without loss of rotation, regardless of the angular relation of the first plane to the second plane; and a means to connect the gauge assembly to the stem assembly including a set screw and a means for limiting motion between the gauge assembly and the stem assembly for rotation relative each other wherein the gauge assembly may be rotated relative to the stem assembly allowing calibration of the dial to the indicator to reflect the appropriate temperature reading on the dial of the gauge assembly and secured in place by the set screw, wherein a temperature change causes the bimetallic strip to expand or contract, resulting in rotation of the free end of the helical strip, thus rotating the indicator.

6. A temperature sensing device having a gauge assembly having a dial, and stem assembly having an indicator, a stem, and bimetallic strip connected to said stem comprising:

a means to connect the indicator to the bimetallic strip;

annular member having a cavity of a predetermined diameter, connected to the stem assembly;

an extension connected to said gauge assembly, having a predetermined diameter whereby said extension may be inserted into the cavity of the annular member of the stem assembly;

a means to secure the gauge assembly to the stem assembly upon insertion of the extension into the cavity of the annular member, including a set screw and a means for limiting motion between the gauge assembly and the stem assembly to rotation relative each other in a single plane, said securing means having an engaged position and a disengaged position allowing the gauge assembly to be moved relative to the stem assembly without disassembly of the device; and the means to secure the gauge assembly to the stem assembly is disengaged and the gauge assembly may be rotated relative to the stem assembly allowing calibration of the dial to the indicator to reflect the desired temperature, wherein a temperature change causes the bimetallic strip to expand or contract, resulting in rotation of the free end of the bimetallic strip thus rotating the indicator.

7. The temperature sensing device of claim 6 further comprising:

said means to secure the gauge assembly to the stem assembly includes a threaded portion whereby the device may be secured relative to the environment in which the stem assembly is located.

8. The temperature sensing device of claim 6 further comprising:

said means to connect the indicator to the bimetallic strip includes a flexible coupling to connect the indicator to the free end of the bimetallic strip;

the stem assembly located at a predetermined angle to the gauge assembly; and the flexible coupling conforming to the angular relation of the stem assembly to the gauge assembly thereby allowing the stem assembly to be positioned at some angle to the gauge assembly without loss of torsional relation between the bimetallic strip and indicator.

9. The temperature sensing device of claim 8 further comprising:

a ball and socket joint having a bore through which the flexible coupling passes whereby the position of the stem assembly may be adjusted and secured at an angle to the gauge assembly.

10. A temperature sensing device having a gauge assembly having a dial, and stem assembly having a stem, an indicator, and helical bimetallic strip having two ends, one end of the helical bimetallic strip connected to said stem, comprising:

a ball joint assembly having a ball and sleeve, said sleeve extending from said ball and said sleeve having a cavity, a bore extending through the center of the ball and opening into the cavity of said sleeve;

a flexible coupling connecting the indicator to the bimetallic strip through the bore of the ball and the cavity of the sleeve, said flexible coupling capable of directly transmitting motion form the bimetallic strip to the indicator without loss of rotation;

the gauge assembly having an extension and a socket for receiving said ball of said ball joint assembly;

said stem assembly having a sleeve bearing of predetermined diameter and length, a bore of predetermined diameter extending through the length of the sleeve bearing so as to allow passage of the stem, the stem passing through said sleeve bearing bore and means to attach the sleeve bearing to the stem assembly, said stem assembly further including an annular member having a bore of predetermined diameter so as to allow passage of the stem therethrough, and a counter bore of predetermined diameter providing a seat for the sleeve bearing;

means to connect the sleeve bearing to the sleeve of the ball joint assembly, said connecting means having an engaged position and disengaged position whereby the sleeve assembly may be rotated relative to the sleeve bearing when the means to connect the sleeve bearing to the sleeve of the ball joint assembly is disengaged;

means to connect the annular member to the sleeve bearing, said means having an engaged position and disengaged position whereby the annular member may be rotated relative to the sleeve bearing when the means to connect the annular member to the sleeve bearing is disengaged;

means to connect the ball to the socket of the gauge assembly, whereby the ball joint may be rotated about the socket, said ball connecting means capable of locking the position of the ball relative to the socket;

the stem assembly having the sleeve bearing connected thereto being inserted into the cavity of the sleeve of the ball joint assembly so that the sleeve bearing is partially within said sleeve, the means to connect the sleeve bearing to the sleeve is engaged thereby unitizing the stem assembly and ball joint assembly, the annular member being placed onto the stem assembly until the sleeve bearing is resting in the counter bore of the annular member;

the means to connect the annular member to the sleeve bearing being engaged, the angle of the stem relative to the gauge adjusted by rotating the ball relative to the socket and being locked into place thereby unitizing the gauge assembly and ball joint assembly;

the means to connect the sleeve of the ball joint assembly to the sleeve bearing being disengaged to allow the unitized gauge assembly and ball joint assembly to be rotated relative to the stem assembly wherein calibration of the dial to the indicator to reflect the appropriate temperature reading is accomplished;

means to connect the sleeve bearing to the sleeve of the ball joint assembly to unitize the gauge assembly, ball joint assembly and stem assembly as one device;

means to connect the annular member to the stem assembly being disengaged to allow the unitized device to be rotated relative to the annular member, thereby achieving the desired gauge position without loss of calibration, wherein a temperature change causes the bimetallic strip to expand or contract, resulting in rotation of the bimetallic strip, thus rotating the indicator.

* * * * *